(12) United States Patent
Hansen et al.

(10) Patent No.: US 8,966,753 B2
(45) Date of Patent: Mar. 3, 2015

(54) METHOD FOR MOUNTING WIND TURBINE BLADES TO A WIND TURBINE HUB

(75) Inventors: Henrik Lynderup Hansen, Hoejerslev (DK); Jesper Moeller, Esbjerg (DK)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 13/441,178

(22) Filed: Apr. 6, 2012

(65) Prior Publication Data

US 2012/0192402 A1 Aug. 2, 2012

Related U.S. Application Data

(62) Division of application No. 11/986,035, filed on Nov. 19, 2007, now Pat. No. 8,191,721.

(30) Foreign Application Priority Data

Nov. 23, 2006 (EP) ..................................... 06024336
Nov. 23, 2006 (EP) ..................................... 06024337
Jul. 12, 2007 (EP) ..................................... 07013724

(51) Int. Cl.
| | | |
|---|---|---|
| B21D 53/78 | (2006.01) | |
| B66C 13/08 | (2006.01) | |
| F03D 11/04 | (2006.01) | |
| B66C 23/18 | (2006.01) | |
| B66C 1/42 | (2006.01) | |
| B66C 23/36 | (2006.01) | |
| F03D 1/00 | (2006.01) | |
| B66C 1/10 | (2006.01) | |

(52) U.S. Cl.
CPC ............... *B66C 23/185* (2013.01); *B66C 13/08* (2013.01); *F03D 11/04* (2013.01); *B66C 1/42* (2013.01); *B66C 23/36* (2013.01); *Y02E 10/721* (2013.01); *Y02E 10/728* (2013.01); *Y02E 10/726* (2013.01); *F05B 2250/30* (2013.01); *F03D 1/001* (2013.01); *B66C 1/108* (2013.01); *F05B 2230/61* (2013.01)
USPC ............................................ 29/889; 212/256

(58) Field of Classification Search
USPC ............................................ 29/889; 212/256
See application file for complete search history.

(56) References Cited

U.S. PATENT DOCUMENTS

| | | |
|---|---|---|
| 2,166,479 A | 7/1939 | Ruddock |
| 3,658,191 A | 4/1972 | Murphy |
| 2005/0019166 A1* | 1/2005 | Bervang .................... 416/244 A |

(Continued)

FOREIGN PATENT DOCUMENTS

| | | |
|---|---|---|
| CN | 1688808 A | 10/2005 |
| CN | 101541660 A | 9/2009 |

(Continued)

OTHER PUBLICATIONS

Co-pending U.S. Appl. No. 12/960,298.*

(Continued)

*Primary Examiner* — Moshe Wilensky

(57) ABSTRACT

A method for mounting a wind turbine blade to a wind turbine hub by use of a crane boom is provided. An orientation of the blade is kept substantially horizontal when the blade is lifted off the ground and mounted to the rotor hub. Control wires, which connect the blade via the crane boom to a winch arrangement, are used for keeping the blade orientation substantially horizontal in addition to at least one bearing wire for bearing the blade weight.

11 Claims, 3 Drawing Sheets

(56) References Cited

U.S. PATENT DOCUMENTS

| | | |
|---|---|---|
| 2006/0045653 A1 | 3/2006 | Edwards |
| 2006/0120809 A1 | 6/2006 | Ingram |
| 2006/0147308 A1 | 7/2006 | Wobben |
| 2010/0018055 A1* | 1/2010 | Lynderup et al. ............... 29/889 |

FOREIGN PATENT DOCUMENTS

| | | |
|---|---|---|
| EP | 0471305 A1 | 2/1992 |
| EP | 2084098 B1 | 2/2011 |
| GB | 1031022 A | 5/1966 |
| GB | 2252295 A | 8/1992 |
| JP | 4237876 A | 8/1992 |
| JP | 5227062 A | 9/1993 |
| JP | 6156975 A | 6/1994 |
| JP | 7323992 A | 12/1995 |
| JP | 10129980 A | 5/1998 |
| JP | 2000204792 A | 7/2000 |
| JP | 2005527739 T | 9/2005 |
| JP | 2006515043 T | 5/2006 |
| WO | WO 03100248 A1 | 12/2003 |
| WO | WO 03100249 A1 | 12/2003 |
| WO | WO 2007033671 A1 | 3/2007 |

OTHER PUBLICATIONS

James F. Manwell, John MacLeod, Sally Wright, Lynn DiTullio, Jon McGowan: "Hull Wind II: A case study of the Development of a Second Large Wind Turbine Installation in the Town of Hull, MA", American Wind Energy Association Windpower 2006 Conference; Book; 2006.

Windkraftanlagen, Erich Hau: "Kapitel 18: Planung, Errichtung und Betrieb", 3rd edition; Book; 2003.

Vestas Document disclosing instructions to installation engineers, entitled "Mounting of Individual Blades, Vertically"; Others; 2005.

Photo of horizontal blade installation in Boone North Carlina (May 1, 1979), NASA, MOD-1, Wind Turbine; Book.

Internet: Wikipedia, Smola welcome page, The Wind Power web page giving specific details of a Smola Windfarm; Others.

An enlarged photograph from the Weldex Website; Others.

Weldex website "The Wayback Machine" at http://www.archive.org; Others.

The code for the page displaying the photo and the tag taken from the wayback machine webside; Others.

A print out of the internet site www.gjestekro.no captured by the Wayback machine showing a second photograph of the Smola windpark installation in 2005, and an enlarged print of the displayed photograph; Others.

Three photos provided by Magne Gjernes of the Smola Kommune; Others.

Technical document in Japanese illustrating the LR1400W; Others; 2005.

* cited by examiner

METHOD FOR MOUNTING WIND TURBINE BLADES TO A WIND TURBINE HUB

CROSS REFERENCE TO RELATED APPLICATIONS

This application is a divisional application of US non-provisional application Ser. No. 11/986,035 filed Nov. 19, 2007 now U.S. Pat. No. 8,191,721. The US non-provisional application claims priority of European Patent Office application no. 06024336.7 EP filed Nov. 23, 2006, European Patent Office application no. 06024337.5 EP filed Nov. 23, 2006, and European Patent Office application no. 07013724 EP filed Jul. 12, 2007. All of the applications are incorporated by reference herein in their entirety.

FIELD OF INVENTION

Methods of handling wind turbine blades and mounting said blades on a wind turbine and a system and gripping unit for handling a wind turbine blade are disclosed. In particular, a method of mounting wind turbine blades to a rotor hub is provided, wherein the orientation of the blades is kept substantially horizontal when the blade is lifted off the ground.

BACKGROUND OF INVENTION

Modern wind turbines usually comprise a rotor with a considerable diameter and width. Mounting a wind turbine could include the steps of transporting the different elements to the site of the wind turbine, assembling the tower sections and the tower, lifting the wind turbine nacelle with a crane and mounting the nacelle on the top of the tower, assembling the wind turbine rotor on the ground, lifting the wind turbine rotor with a crane and mounting the rotor to a low speed shaft extending from the nacelle.

The usual way of mounting a wind turbine comprises a number of drawbacks which have become more and more severe with the increasing size and width of the wind turbine rotor. Assembling the wind turbine rotor on the ground is especially difficult as it requires a large area free of obstacles which is substantially horizontal and stable in order to be accessible for the assembly workers and the crane. Furthermore, lifting the rotor to the nacelle is rather complicated as the rotor must be turned by 90° in midair.

From US 2005/019166 A1, it is known to mount a rotor hub to which two blades are already mounted to the nacelle and then mounting the remaining rotor blade to the rotor hub with the blade in a vertical position.

In other lifting systems it is known to pre-mount the wind turbine hub on the nacelle and then lift each wind turbine blade individually to a position next to the hub and perform the mounting of the blades. In one such system, which is disclosed in US 2006/0120809 A1, the lifting is performed with the wind turbine blades held vertically with a lifting device. However, in this lifting system the blade has to be vertical during lifting and mounting. This means that, as a part of the lifting process, the blade has to be turned and during the positioning of the blade there is little control over the angular blade orientation.

In another lifting system which is disclosed in US 2006/0147308 A1, the blade is held substantially horizontal, resting in slings which are held by wires fixed to the turbine blade. This system has the advantage that the blade axis can be maintained in the same position during lifting and mounting as when resting on the ground. However, any wind occurring at the time of lifting will tend to deflect the blade. Consequently, such lifting requires a number of persons stationed at some distance from the turbine during lifting and holding long ropes to help steer the blade. For large blades and tall towers the control of such steering becomes a major challenge.

SUMMARY OF INVENTION

A method for lifting a wind turbine blade to a wind turbine hub is provided as claimed in the claims.

In the method for mounting a wind turbine on a wind turbine hub by use of a crane boom, the orientation of the blade is kept substantially horizontal when the blade is lifted off the ground and mounted to the rotor hub. Controllable wires, which are referred to as control wires in the following, which connect the blade via the crane boom to a winch arrangement are used for keeping the blade orientation substantially horizontal in addition to at least one bearing wire for bearing the blade weight.

By connecting the blade to a winch arrangement via the crane boom, the blade's orientation can be controlled with respect to the crane boom. In contrast thereto, in the state of the art, ropes are held by persons on the ground and the blade's orientation is controlled with respect to some point on the ground. Therefore, when the crane boom moves the blade's orientation does not follow the boom automatically in the state of the art. In the method, however, the blade's horizontal orientation will follow the crane boom's horizontal orientation automatically and controlling the blade's horizontal orientation can be simplified. Moreover, since it is not necessary to have personnel on the ground for handling control ropes, the number of persons needed for mounting the blade to the rotor hub can be reduced. A high degree of controllability can be achieved if at least two control wires are used which can be controlled independently of each other.

The may comprise the following steps: a) lifting at least one wind turbine blade with a lifting system for handling wind turbine blades, wherein said at least one wind turbine blade is oriented in a substantially horizontal position; the lifting system using a lifting device which is designed so as to be attachable to the wind turbine blade and to which the control wires and the at least one bearing wire are connected; b) controlling the orientation of said at least one wind turbine blade in the substantially horizontal position when it has been lifted off the ground using the control wires; and c) fixing said at least one wind turbine blade in a substantially horizontal position to the wind turbine hub. This implementation of the method may further comprise, as a preceding step, the step of lifting a wind turbine hub to a nacelle of a wind turbine with the lifting system and mounting the hub on the nacelle or lifting the wind turbine hub and the nacelle together with the lifting system and mounting the nacelle including the hub on a wind turbine tower.

Furthermore, the control wires used in the method may be kept pre-tensioned when the blade is lifted. By pre-tensioning the control wires, the horizontal orientation of the blade can be kept particularly stable during the lifting process. In particular, as soon as the blade is lifted higher than the point at which the control wires reach the crane boom the blade's orientation can be securely fixed since the bearing cable and control wires drag the blade in more or less opposite directions. If, in this situation, the forces acting on the blade by the bearing wire on the one hand and the control wires on the other hand are high enough the blade is kept stable by these forces acting on three different contact points of the lifting device which is attached to the blade (one contact point for the bearing wire and at least two contact points for the control wires).

A wind turbine blade lifting system which is suitable for performing the method comprises a lifting device with a frame which is designed so as to be connectable to a wind turbine blade to be lifted, a crane boom, a winch arrangement and control wires for controlling the blade orientation to be substantially horizontal when it has been lifted off the ground. The control wires run from the lifting device via the crane boom to the winch arrangement.

By using a winch arrangement for handling the control wires the number of personnel required for lifting a wind turbine blade can be reduced with respect to the state of the art for horizontally lifting wind turbine blades as has been mentioned above. Moreover, in the system, the horizontal orientation of the blade after lifting it off the ground is fixed with respect to the crane boom's orientation. As a consequence, the blade's horizontal orientation automatically follows the horizontal orientation of the crane boom which is not the case in the state of the art lifting systems for horizontally lifting a wind turbine blade.

The winch arrangement is advantageously located at the crane's bottom end. This allows the use of relatively heavy winches without negatively affecting the crane boom's stability. Moreover, locating the winch arrangement at the bottom end increases the accessibility of the winch arrangement as compared to a location in another section of the crane boom.

The control wires may run from the lifting device to pulleys located at the crane boom and from there to the winch arrangement. Using pulleys facilitates the deflection of the control wires. Furthermore, by suitably choosing the location of the pulleys along the length of the crane boom it becomes possible to suitably set the stabilising characteristics of the lifting system. For example, if the pulleys are relatively close to the boom's bottom end soon after lifting the blade off the ground forces of the control wires act in a opposite direction to the pulling force of the bearing wire. On the other hand, if the pulleys are located close to the top end of the crane boom the distance between the pulleys and the lifting device, i.e. the distance between the pulleys and the blade, can be minimised in the fully lifted position of the blade. This helps to increase the control performance of the control wires in the fully lifted state of the blade. It is therefore particularly advantageous if the pulleys are moveable with respect to the crane boom's extension. This allows the pulleys to follow the lifting process so as to continuously optimise the pulley's location at the crane boom with respect to the lifting device, i.e. with respect to the blade.

If the winch arrangement comprises at least two independently controllable winches for at least two control wires, the control action can easily be performed by using these winches.

The wind turbine blade lifting system may further comprise a tensioning device acting on the winch arrangement or on the control wires so as to keep the control wires tensioned during the lifting process. By tensioning or pre-tensioning the control wires, the orientation of the blade can be held particularly stable during the lifting process. The tensioning device may further comprise a control arrangement acting on the winch arrangement or on the control wires such as to allow the horizontal orientation of the blade to be controlled by the amount of tensioning of the control wires.

DETAILED DESCRIPTION OF INVENTION

Figure 1:
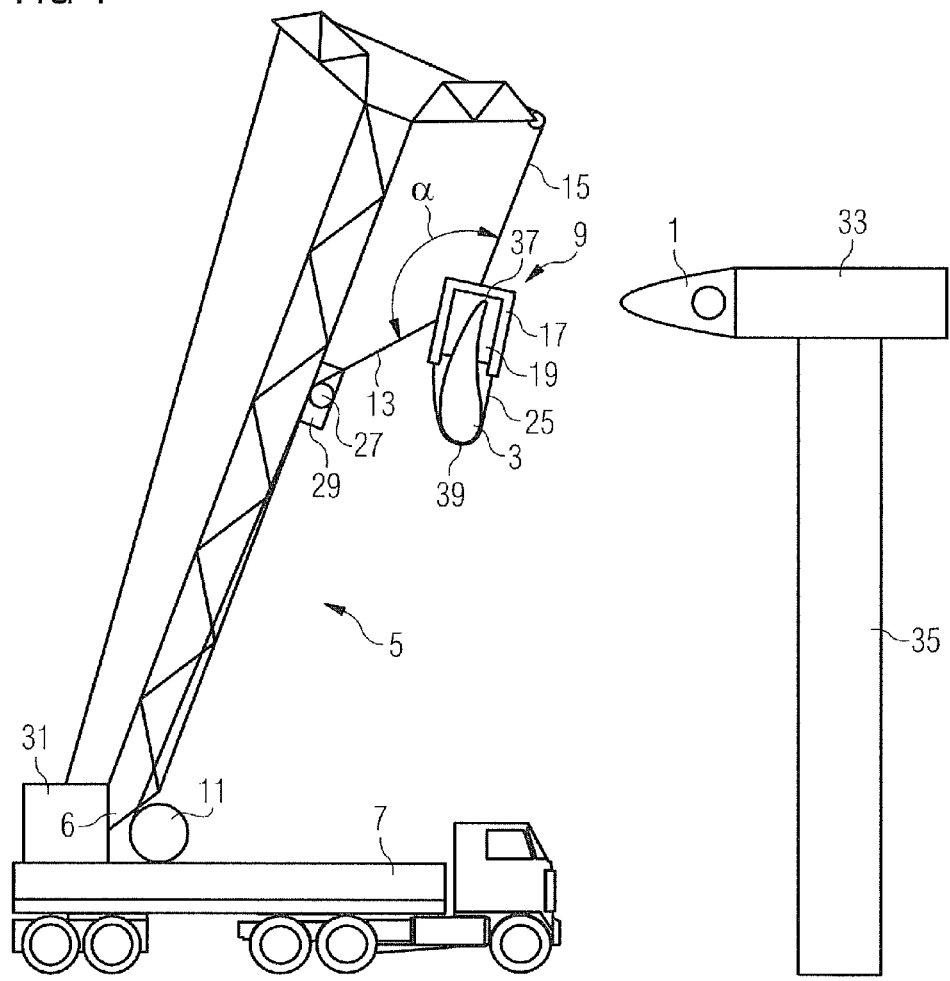
FIG. 1 shows a wind turbine blade lifting system.
Figure 2:
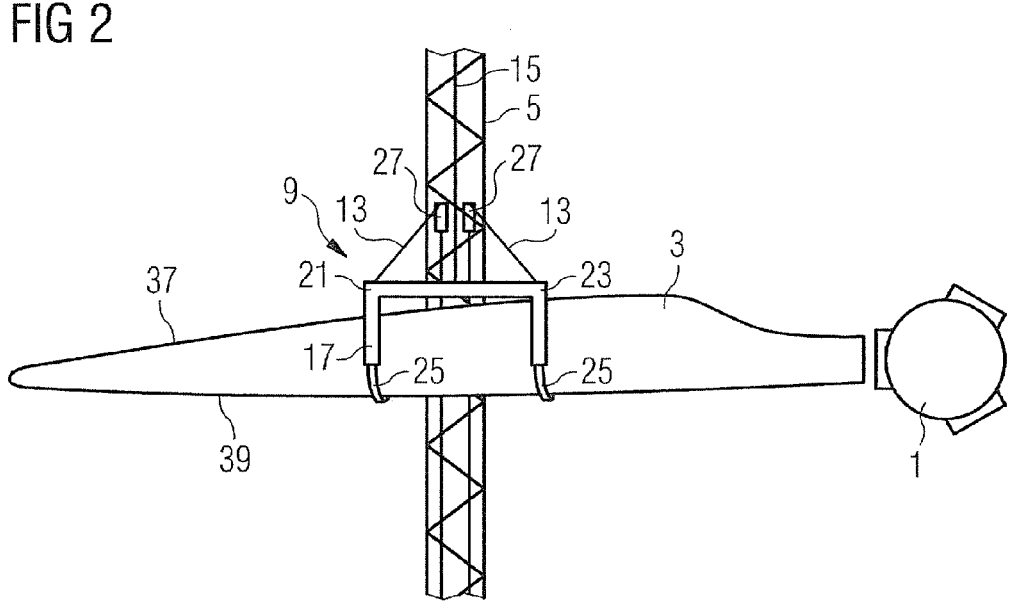
FIG. 2 shows a section of the wind turbine blade lifting system in a viewing direction which is perpendicular to the viewing direction of FIG. 1.

A wind turbine blade lifting system will now be described with respect to FIGS. 1 and 2. While FIG. 1 shows the lifting system in a view onto the tip of the lifted turbine blade, FIG. 2 shows the upper part of the wind turbine blade lifting system in a plan view onto the blade's body. Also shown in both figures is the rotor hub 1 onto which the blade 3 is to be mounted. It is located at a nacelle 33 at the top of a tower 35.

The wind turbine blade lifting system comprises a crane boom 5 which is mounted onto a truck 7, a lifting device 9 which can be connected to the wind turbine blade 3, a winch arrangement comprising two individually controllable winches 11, control wires 13 (only one control wire is visible in FIG. 1) and a bearing wire 15.

The holding device 9 comprises a frame 17 and seats 19 on both ends 21, 23 of the frame 17 to which the wind turbine blade 3 is pressed by belts or straps 25. In addition, the bearing wire 15 is fixed to a central area of the frame 17 and the control wires 13 are fixed to the frame 17 at its ends 21, 23.

The control wires run via pulleys 27 which are located at the boom 5 to the winches 11 of the winch arrangement. Both winches 11 of the winch arrangement are located at the bottom end 6 of the boom 5 and can be controlled individually so as to tension or loosen both control wires 13 individually. The pulleys 27 are mounted onto a sliding carriage 29 which can be moved along the boom 5.

The bearing wire 15 is connected to a further winch 31 which is operated for lifting the lifting device 9 with the blade 3 fixed thereto. In contrast thereto, the control wires 13 have no substantial bearing function.

Figure 3:
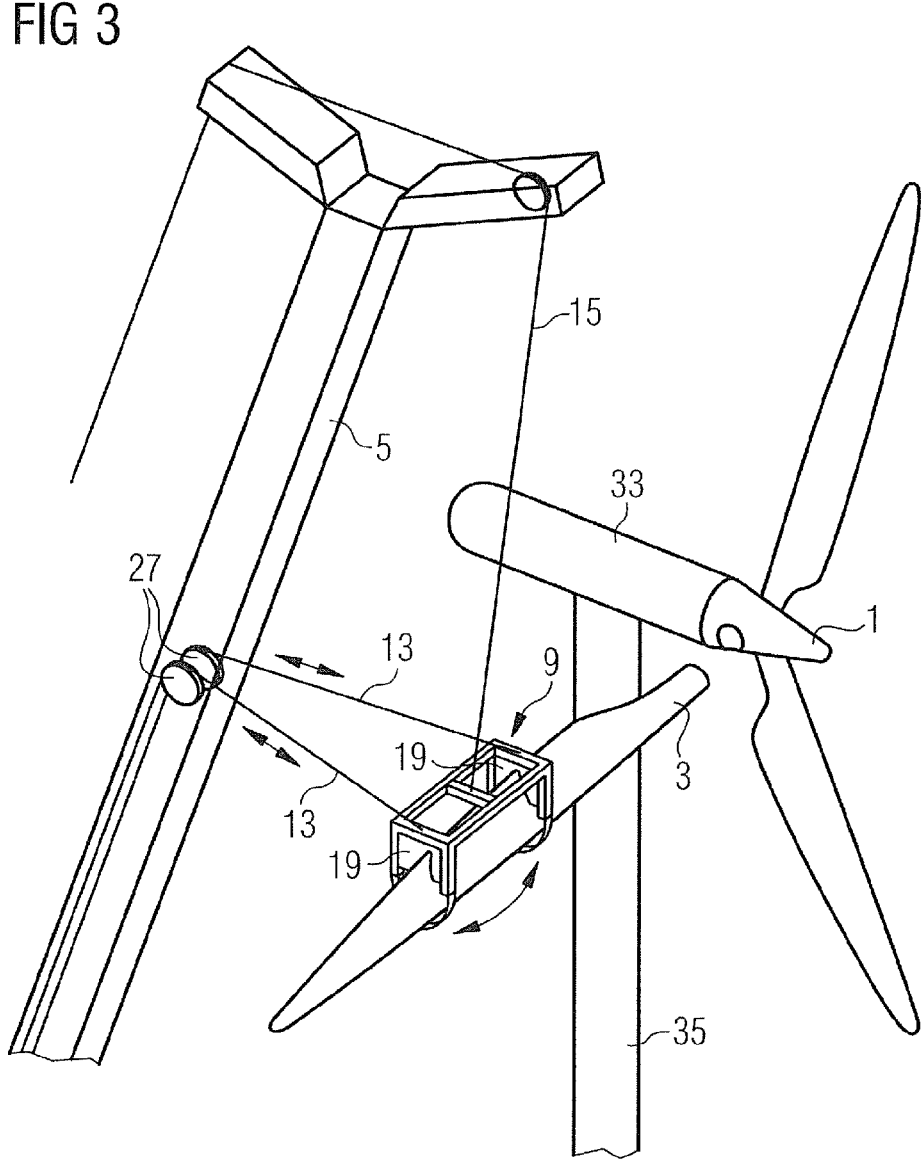
FIG. 3 shows the mounting of a wind turbine blade to a rotor hub by the use of the wind turbine blade lifting system.

Lifting a wind turbine blade 3 and mounting it to the rotor hub of a wind turbine will now be described with respect to FIGS. 1, 2 and 3. The method comprises the steps of: i) lifting a wind turbine hub 1 to the nacelle 33 of a wind turbine with a lifting system and mounting the hub 1 on the nacelle 33, or lifting the wind turbine hub 1 and the nacelle 33 together with the lifting system and mounting the nacelle 33 including the hub 1 on a wind turbine tower 35; ii) lifting at least one wind turbine blade 3 with a lifting system for handling the wind turbine blades 3, lifting said at least one wind turbine blade 3 into a substantially horizontal position; iii) controlling the orientation of said at least one wind turbine blade 3 in the substantially horizontal position when it has been lifted off the ground, using control wires 13 connecting the lifting system to the crane boom 5, and iv) fixing said at least one wind turbine blade 3 in a substantially horizontal position to the wind turbine hub 1. Hereby, it is possible to handle and mount a wind turbine blade 3 in an advantageous manner.

In an embodiment, a control wire 13 is attached at each end 21, 23 of the lifting frame 9, as has been described with respect to FIGS. 1 and 2. The two control wires 13 run to the crane boom 5 and from there over a pulley 27 to two hydraulic winches 11 fitted to the crane boom 5 at its bottom end. The two hydraulic winches 11 can be controlled independently.

In another embodiment the boom control wires 13 are kept automatically pre-tensioned during the lifting process so that control is maintained even though the distance from the pulleys 27 on the crane boom 5 to the lifting device 9 is changed during the hoisting of the lifting device 9. This is accomplished by having one hydraulic winch that automatically maintains wire tension and another hydraulic winch that regulates the horizontal orientation and is controlled manually.

The different steps of the method will now be described in more detail.

In a first step, the wind turbine rotor hub 1 is mounted to the nacelle 33 of a wind turbine in a conventional manner by using the crane boom 5. Alternatively, the rotor hub 1 could be mounted to the nacelle 33 on the ground and the nacelle together with the rotor hub 1 mounted thereto would then be mounted to the top of the tower 35 by using the crane boom 5. As mounting the nacelle 33 onto the tower top and mounting the rotor hub 1 to the nacelle 33 are conventional steps they are not depicted in the figures.

In the next step, the lifting device 9 is mounted onto a wind turbine blade 3 which rests on the ground with its downstream edge 37 showing upwards. For mounting the lifting device 9 the frame 17 is lowered onto the rotor blade 3 so that the seats 19 are set onto the downstream section 37 of the blade 3. Then, the belts 25 are wound around the upstream edge 39 of the blade 3, fixed to the frame 17 and tensioned so as to press the blade 3 to the seat 19.

After the lifting device 9 has been mounted onto the blade 3 and the blade 3 has been secured to the lifting device 9, they are both lifted together by coiling the bearing wire 15 with the second winch 31. At the same time, the control wires 13 are tensioned so as to drag the lifting device 9 with the blade 3 mounted therein towards the crane boom 5. During lifting, the sliding carriage with the pulleys 27 follows the blade 3 on its way upwards where it is located slightly below the lifting device 9. By this measure the length of the control wires between the pulleys 27 and the frame 17 of the lifting device 9 can be kept low and almost constant during the whole lifting process.

By locating the pulleys 27 below the frame 17 the tensioning force of the control wires act in a direction that includes an angle α to the lifting force exerted by the bearing wire 15. In the present embodiment, as shown in FIG. 1, the angle α is about 120°. Therefore, the tensioning forces exerted by the control wires 13 have substantial components in the direction opposite the lifting force exerted by the bearing wire 15. By this configuration the blade's position can be securely stabilised. At the same time the components acting perpendicular to the lifting force are still large enough for suitably controlling the horizontal orientation of the blade 3. The ratio of the tensioning force components which act in the opposite direction to the lifting force to those components which act perpendicular to the lifting force can be set by the position of the sliding carriage 29 relative to the lifting device 9. The lower the sliding carriage 29 is with respect to the lifting device 9 the higher the component of the tensioning force is that acts in the opposite direction to the lifting force as compared to the component acting in a perpendicular direction to the lifting force.

By differently pre-tensioning the control wires, the horizontal orientation of the turbine blade 3 can be varied. Varying the pre-tension of the control wires can either be done directly at the winches, for instance by personnel located at the winches 11, or remotely by the crane operator which would offer the advantage that all control actions for positioning the blade relative to the rotor hub 1 can be performed by the same person. Positioning the wind turbine blade 3 relative to the rotor hub 1 for mounting the blade 3 to the hub 1 is schematically shown in FIG. 3.

Although pre-tensioning the control wires 13 and controlling the horizontal orientation of the wind turbine blade 3 is performed by controlling both winches 11 of the winch arrangement individually it would also be possible to provide a winch which is acting on both control wires so as to always exert the same tensioning force on both control wires 13 while a second winch is used for regulating the horizontal orientation of the wind turbine rotor blade 3. This would offer the advantage that only one winch needs to be controlled in order to control the horizontal position of the blade 3. However, this simplification of controlling the horizontal position of the blade 3 has to be paid for by a more complex construction of the winch arrangement.

After the wind turbine blade 3 has been precisely oriented for mounting it to the rotor hub 1 personnel at the rotor hub fix the blade 3 to the hub and then the lifting device 9 is dismantled from the rotor blade 3.

Although in the described embodiment the pulleys are mounted on a sliding carriage 29 which can move along the boom 5, the pulleys can also be located at the boom 5 at a fixed position. In this case the ratio of the tensioning force components acting in the direction opposite the lifting force to the components acting perpendicular to the lifting force varies during the lifting process. However, this can be accounted for by suitably pre-tensioning the control wires 13 during the lifting process.

A possibility of controlling a wind turbine rotor blade's 3 orientation in the substantially horizontal position when it has been lifted off the ground, using control wires 13 connecting the lifting system 9 to a crane boom 5 is provided. The feature of lifting the wind turbine blade 3 in the same substantially horizontal orientation as it has when fitted to the lifting device 9 when lying on the ground is advantageous as this eliminates any need for upturning the blade. The feature of controlling the orientation of the blade 3 in the substantially horizontal position when it has been lifted off the ground, using control wires 13 connecting the lifting system 9 to the crane boom 5 is advantageous as it eliminates the need for a group of persons stationed at ground level and seeking to control the orientation using long ropes. When installing the blade 3, the crane operator can control both the lifting height and the blade orientation from one control position.

The invention claimed is:

1. A method for mounting a wind turbine blade to a wind turbine hub, comprising:
   providing a crane boom and a winch arrangement located at the bottom of the crane boom;
   arranging a wind turbine blade in a lifting device, which is attached to a bearing wire and to a plurality of control wires; the control wires further attached to the winch arrangement;
   keeping an orientation of the wind turbine blade substantially horizontal when the wind turbine blade is lifted off a ground and mounted to the wind turbine hub, the keeping the orientation includes adjusting the plurality of control wires via the winch arrangement;
   lifting the wind turbine blade, the bearing wire bears the weight of the wing turbine blade in the lifting device during lifting; and
   fixing the wind turbine blade in the substantially horizontal position to the wind turbine hub,
   wherein each control wire is threaded through a pulley that is vertically located between the winch arrangement and a vertical location of the lifting device during the fixing step, and
   wherein each control wire exerts a tensioning force at an angle to a lifting force exerted by the bearing wire.

2. The method as claimed in claim 1, further comprising:
lifting the wind turbine hub to a nacelle of the wind turbine with the lifting device, and mounting the hub on the nacelle.

3. The method as claimed in claim 1, further comprising:
lifting the wind turbine hub and the nacelle together with the lifting device and mounting the nacelle with the hub on a wind turbine tower.

4. The method as claimed in claim 1, wherein each of the plurality of control wires are controlled independently of each other.

5. The method as claimed in claim 4, wherein the control wires are kept pre-tensioned when the blade is lifted.

6. The method as claimed in claim 1, wherein a first of the plurality of control wires is attached to the lifting device at a first longitudinal end and a second of plurality of control wires is attached to the lifting device at a second longitudinal end.

7. The method as claimed in claim 1, wherein the pulley is mounted onto a sliding carriage which mores along the crane boom.

8. The method as claimed in claim 1, wherein the bearing wire is further connected to a second winch arrangement and the lifting includes operating the second winch arrangement.

9. The method as claimed in claim 1, wherein the lifting bearing wire is attached at a top of the lifting device.

10. The method as claimed in claim 1, wherein forces acting on the lifting device are in different directions for the bearing wire than for the plurality of control wires.

11. The method as claimed in claim 1, wherein the plurality of control wires are substantially not weight bearing.

* * * * *